United States Patent
Sultenfuss et al.

(10) Patent No.: US 8,934,755 B2
(45) Date of Patent: *Jan. 13, 2015

(54) SYSTEM AND METHOD FOR MANAGING MULTIPLE INDEPENDENT GRAPHIC SOURCES IN AN INFORMATION HANDLING SYSTEM

(75) Inventors: Andrew T. Sultenfuss, Leander, TX (US); Randall E. Juenger, Belton, TX (US)

(73) Assignee: Dell Products, LP, Round Rock, TX (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/492,335

(22) Filed: Jun. 8, 2012

(65) Prior Publication Data
US 2012/0242895 A1    Sep. 27, 2012

Related U.S. Application Data

(63) Continuation of application No. 12/549,954, filed on Aug. 28, 2009, now Pat. No. 8,218,940.

(51) Int. Cl.
| H04N 5/765 | (2006.01) |
|---|---|
| H04N 5/775 | (2006.01) |
| H04N 5/46 | (2006.01) |
| H04N 21/4143 | (2011.01) |
| H04N 21/41 | (2011.01) |
| H04N 21/4402 | (2011.01) |
| H04N 21/443 | (2011.01) |
| H04N 21/462 | (2011.01) |

(52) U.S. Cl.
CPC ................ *H04N 5/765* (2013.01); *H04N 5/46* (2013.01); *H04N 21/4143* (2013.01); *H04N 21/4122* (2013.01); *H04N 21/4402* (2013.01); *H04N 21/4436* (2013.01); *H04N 21/4622* (2013.01)
USPC .......................................... 386/232; 386/230

(58) Field of Classification Search
CPC ..... H04N 5/46; H04N 5/765; H04N 21/4143; H04N 21/4622; H04N 21/4402; H04N 21/4436; H04N 21/4122
USPC .......................... 386/232, 230, 219, 323, 324
See application file for complete search history.

(56) References Cited

U.S. PATENT DOCUMENTS

| 6,411,825 | B1 | 6/2002 | Csapo et al. |
|---|---|---|---|
| 6,735,663 | B2 | 5/2004 | Watts, Jr. et al. |
| 6,735,708 | B2 | 5/2004 | Watts, Jr. |
| 6,801,974 | B1 | 10/2004 | Watts, Jr. et al. |
| 6,816,925 | B2 | 11/2004 | Watts, Jr. |
| 6,826,391 | B2 | 11/2004 | Leinonen et al. |
| 7,149,837 | B2 | 12/2006 | Watts, Jr. et al. |
| 7,197,584 | B2 | 3/2007 | Huber et al. |
| 7,212,250 | B1 | 5/2007 | Neal |
| 7,268,755 | B2 | 9/2007 | Selwan |
| 7,636,560 | B2 | 12/2009 | Ku |
| 7,720,506 | B1 | 5/2010 | Gribble |
| 8,218,940 | B2 * | 7/2012 | Sultenfuss et al. ............ 386/232 |
| 2002/0103005 | A1 | 8/2002 | Watts, Jr. et al. |

(Continued)

*Primary Examiner* — Robert Chevalier
(74) *Attorney, Agent, or Firm* — Larson Newman, LLP

(57) ABSTRACT

An information handling system includes a video selector to convert a first video signal into a second video signal, convert the first video signal into a third video signal, and couple a video output to a selected one of a first video input or a second video input.

20 Claims, 4 Drawing Sheets

(56) References Cited

U.S. PATENT DOCUMENTS

| | | |
|---|---|---|
| 2003/0176176 A1 | 9/2003 | Leinonen et al. |
| 2004/0063425 A1 | 4/2004 | Wakutsu et al. |
| 2004/0162107 A1 | 8/2004 | Klemetti et al. |
| 2004/0203709 A1 | 10/2004 | Luneau |
| 2006/0079275 A1 | 4/2006 | Ella et al. |
| 2007/0056000 A1 | 3/2007 | Pantalone et al. |
| 2007/0103836 A1 | 5/2007 | Oh |
| 2007/0110393 A1 | 5/2007 | Jang |
| 2007/0168763 A1 | 7/2007 | Sauber et al. |
| 2007/0213105 A1 | 9/2007 | Huber et al. |
| 2008/0034238 A1 | 2/2008 | Hendry et al. |
| 2009/0015604 A1* | 1/2009 | Ozaki et al. .................. 345/694 |
| 2010/0036983 A1 | 2/2010 | Utz et al. |
| 2010/0107238 A1 | 4/2010 | Stedman et al. |
| 2010/0115303 A1 | 5/2010 | Stedman et al. |
| 2010/0115313 A1 | 5/2010 | Belt et al. |
| 2011/0052142 A1 | 3/2011 | Sultenfuss et al. |

* cited by examiner

SYSTEM AND METHOD FOR MANAGING MULTIPLE INDEPENDENT GRAPHIC SOURCES IN AN INFORMATION HANDLING SYSTEM

CROSS REFERENCE TO RELATED APPLICATIONS

This application is a continuation of U.S. patent application Ser. No. 12/549,954, entitled "System and Method for Managing Multiple Independent Graphic Sources in an Information Handling System," filed on Aug. 28, 2009, the disclosure of which is hereby expressly incorporated by reference in its entirety.

FIELD OF THE DISCLOSURE

This disclosure relates generally to information handling systems, and relates more particularly to display devices in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

Figure 1:
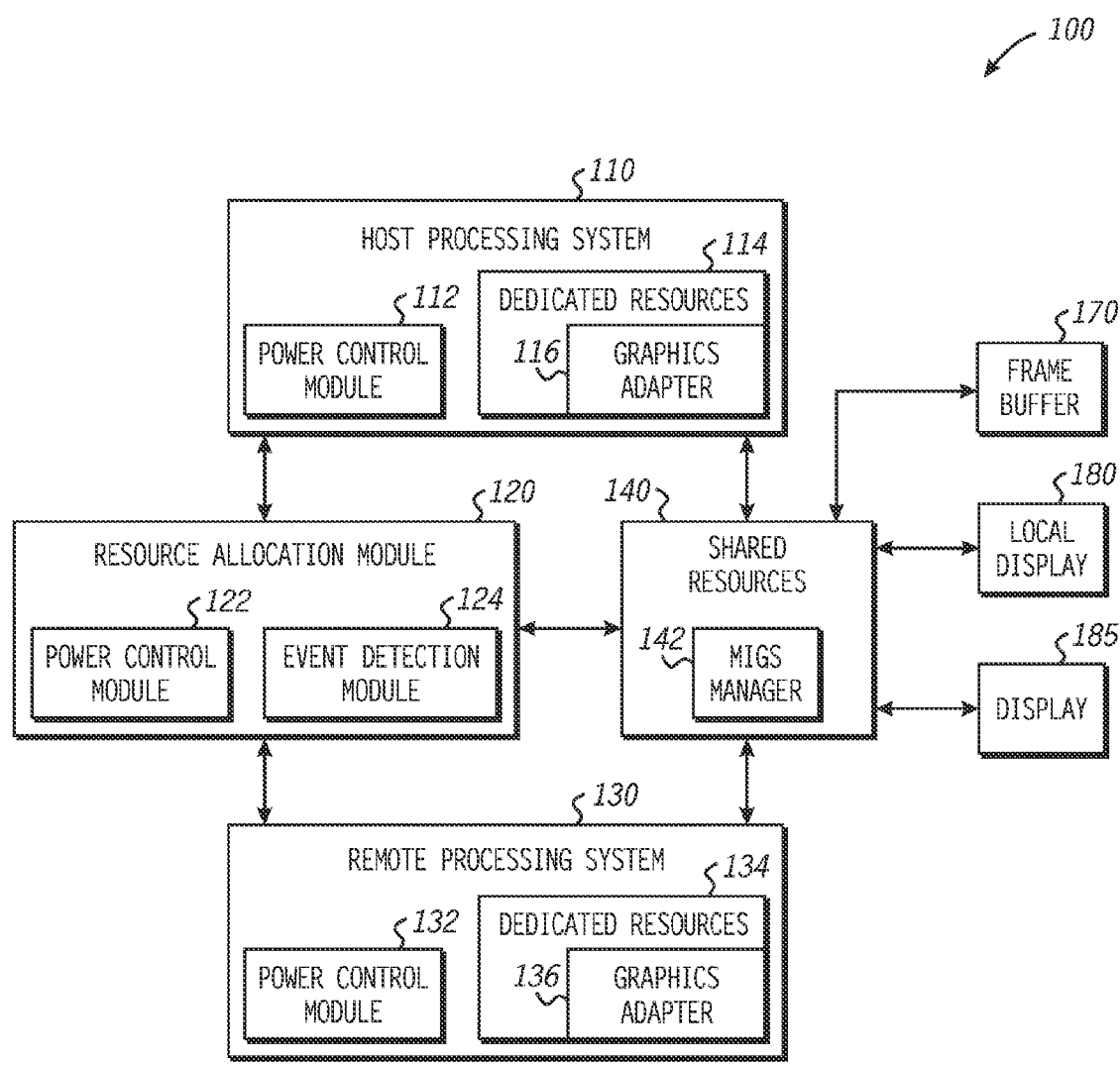
FIG. 1 is a functional block diagram illustrating an information handling system with a multiple independent graphics source manager, according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

An information handling system that includes a host processing system and a remote processing system can also include graphics adapters that permit the information handling system to display information on one or more display devices. In a particular embodiment, described herein, the host processing system has an associated graphics adapter, and the remote processing system has an associated graphics adapter. The information handling system has one or more display devices that can be shared among the graphics adapters.

FIG. 1 illustrates an embodiment of an information handling system 100 according to an embodiment of the present disclosure. Information handling system 100 includes a host processing system 110, a resource allocation module 120, a remote processing system 130, shared resources 140, one or more mid-stream frame buffers 170, a local display device 180 and one or more additional secondary display devices 185. Host processing system 110 and remote processing system 130 are each connected to resource allocation module 120, and to shared resources 140. Resource allocation module 120 is also connected to shared resources 140. Shared resources 140 is connected to mid-stream frame buffer 170, to local display device 180, and to secondary display device 185. Local display device 180 and secondary display device 185 can each include a display device frame buffer (not illustrated).

Host processing system 110 and remote processing system 130 are independent processing systems. An independent processing system is a system, such as a computer system, that is able to carry out tasks independently of other processing systems in an information handling system by independently controlling system resources including dedicated and shared resources. The tasks executed by each processing system are specified by software or firmware executing at the associated processing system. In a particular embodiment, host processing system 110 and remote processing system 130 each include an independent processor device (not illustrated), such as a central processing unit (CPU), and an input/output processing device, such as a chipset, and are each configured to operate independently of the other. Thus host processing system 110 and remote processing system 130 do not share tasks and each executes program threads from a different application program or operating system. In another embodiment, host processing system 110 and remote processing system 130 execute programs from a common application program or operating systems.

Host processing system 110 includes a power control module 112 and a set of dedicated resources 114. Similarly, remote processing system 130 includes a power control module 132 and a set of dedicated resources 134. Power control module 112 is configured to set the operational power mode for host processing system 110 and dedicated resources 114, and power control module 132 is configured to set the operational power mode for remote processing system 130 and dedicated resources 134. Thus, power control module 112 can set the operational power mode for host processing system 110 and dedicated resources 114, and power control module 132 can set the operational power mode for host processing system 130 and dedicated resources 134. An operational power mode refers to one of a plurality of potential power states during operation of the associated device. Thus, in different operational power modes, a device will typically consume different amounts of power, and have different functionality. Thus, for example, a particular device (not illustrated) of dedicated resources 114 can be set to an active power mode or to one or more low-power modes. In the active mode, the device executes designated operations at a relatively high speed and consumes a relatively large amount of power. In a first low-power mode, the device executes designated operations at a reduced rate of speed, and consumes a relatively small amount of power. In a second low-power mode, the device does not execute designated operations, but retains state information from the active mode and the first low-power mode, so that the device is able to execute the designated operations with the retained state information when the device returns to either the active mode or the first low-power mode.

In a particular embodiment, power control modules 112 and 132 set the power modes for the associated processing system 110 and 130, and for dedicated resources 114 and 134, independently. Thus, for example, power control module 132 can set the power mode of remote processing system 130 to a first power mode (such as an active mode) while setting the power mode of dedicated resources 134 to a second power mode (such as a low-power mode). Further, power control module 132 can set a particular device (not illustrated) of dedicated resources 134 to one power mode (such as a first low-power mode) and a second particular device of dedicated resources 134 to a second power mode (such as a second low-power mode). In another embodiment, host processing system 110 and the remote processing system 130 can each include multiple voltage rails (not illustrated) that are derived from a common power source, such as a battery. The power mode for a particular device can be set by connecting a power node of the device to a designated voltage rail.

Dedicated resources 114 and 134 and shared resources 140 each include one or more system resource. A system resource is a resource of information handling system 100 that is employed by processing systems 110 and 130 to perform a designated task. Examples of system resources include input/output devices, interface devices, memory devices, controller devices, and the like. Dedicated resources 114 and 134 each include one or more system resources that cannot be directly controlled by a processing system 110 or 130 other than the processing system 110 or 130 to which it is dedicated. For example, a particular device in dedicated resources 114 cannot be directly controlled by remote processing system 130, and another particular device in dedicated resources 134 cannot be directly controlled by host processing system 110. Shared resources 140 includes one or more system resource that can be controlled by either processing system 110 or 130. In a particular embodiment, one or more system resource is embodied in different semiconductor substrates. In the illustrated embodiment, dedicated resources 114 includes a graphics adapter 116, and dedicated resources 134 includes a graphics adapter 136. Shared resources 140 includes a multiple independent graphics source (MIGS) manager 142.

Resource allocation module 120 includes a power control module 122. Power control module 122 stores a set of power profiles (not illustrated) and is configured to select one of the power profiles based on received event information. Based on the selected power profile, power control module 122 sets the power mode for any of shared resources 140, dedicated resources 114, and dedicated resources 134. To set the power mode for the system resources, power control module 122 communicates power control messages between host processing system 110 and remote processing system 130. Each power control message represents a request to set a power mode for a particular system resource or processing system. In a particular embodiment, in response to a power control message, power control module 122 directly sets a power mode for any of the dedicated resources 114, dedicated resources 134, and shared resources 140. In another embodiment, in response to a power control message, power control module 122 communicates messages to power control modules 112 and 132, as appropriate, to set each of dedicated resources 114 and 134, respectively, to the requested power mode.

Resource allocation module 120 also includes an event detection module 124. Event detection module 124 is configured to detect an event at information handling system 100. An event includes an internal or external stimulus to information handling system 100. A non-limiting example of an event includes receiving a user input, or a communication from a network, including network 150, opening or closing of application software, or the like. In response to detecting an event, event detection module 124 accesses system state information indicating the state of host processing system 110 and of remote processing system 130. The state of processing systems 110 and 130 refers to the operational configuration at a particular point in time. In a particular embodiment, the state information of processing systems 110 and 130 includes information delineating the operating systems or applications being executed at each processing system 110 and 130, the power mode of processing systems 110 and 130 and of dedicated resources 114 and 134, the tasks being executed or scheduled for execution at processing systems 110 and 130, and the like. In response to detecting an event, event detection module 124 communicates event information indicating the event type and the system state information to the power control modules 112 and 132. The event type can include the source of the event, the timing of the event, or the like.

In operation, when event detection module 124 detects an event, power control module 122 sets the power mode for one or more system resources. The operation can be illustrated with the following example. Shared resources 140 can include a network interface device (not illustrated). Further, remote processing system 130 can interact with the network interface while host processing system 110 is in a low-power mode. When event detection module 124 detects an incoming message, such as an email message, at the network interface, event detection module 124 provides the event information to power control module 122. The event information can include the source and timing of the event, and the system state information. Based on the event information, power control module 122 selects a power profile that includes the desired power modes for dedicated resources 114, dedicated resources 134, and shared resources 140.

In a particular embodiment, power control module 122 can determine that, because host processing system 110 is in a low-power mode, host processing system 110 should not be placed in an active mode based on the incoming message, and dedicated resources 114 should remain in the low-power mode. In another embodiment, power control module 122 can determine that the incoming message should be displayed immediately via local display device 180. Accordingly, power control module 122 will communicate a message to power control module 112 to place the display interface in the active mode. Remote processing system 130 can then display the incoming message on local display device 180.

In response to another event of a different type, power control module 122 can select a different power profile to maintain the display interface in the low-power state, while placing other system resources in an active state. For example, if the event is indicative of a low-battery condition or other loss of power, power control module 122 can place an audio interface (not illustrated) in shared resources 140 in an active state, while maintaining the display interface in a low-power state. A warning sound can then be played via the audio interface. Thus, power control module 122 can select a power profile, and therefore the power mode of each system resource, based on a type of event.

Further, power control module 122 can select a power profile based on the state of each processing system, as indicated by the system state information. For example, if an email message is received when the system state information indicates host processing system 110 is in a low-power state, power control module 122 can select a power profile so that an indicator light is placed in an active mode, to give an indication of a received message, while the visual display interface is left in low-power mode. However, if the system state information indicates host processing system 110 is in an active mode and is executing an email application, power control module 122 can keep the indicator light in the low-power mode, because the indication of the received email message will be displayed by the email application.

Thus power control module 122 selects the appropriate power profile based on the type of event indicated by event detection module 124, as well as the state of processing systems 110 and 130. The power profiles can be set so that only those system resources needed to service a designated event in a designated system state are placed in an active mode, thereby reducing overall power consumption of the information handling system 100.

Host processing system 110 and remote processing system 130 are each capable of displaying information on local display device 180 and secondary display device 185. Thus, when host processing system 110 needs to display information on, for example, local display device 180, event detection module 124 detects the event and resource allocation module 120 sends a control signal to shared resources 140, instructing MIGS manager 142 to connect graphics adapter 116 to local display device 180. Once thus connected, the information is displayed on local display device 180. Likewise, when remote processing system 130 needs to display information on, for example, secondary display device 185, event detection module 124 detects the event and resource allocation module 120 sends a control signal to shared resources 140, instructing MIGS manager 142 to connect 136 to secondary display device 185, and the information is displayed on secondary display device 185.

Graphics adapters 116 and 136 each provide video input signals to MIGS manager 142 and can each include a graphics adapter frame buffer (not illustrated). In a particular embodiment, the video input signal provided by graphics adapter 116 is in a different format than the video input signal provided by graphics adapter 136. For example, graphics adapter 116 can be a high performance graphics adapter capable of providing a video input signal in accordance with a variety of display formats such as Widescreen Ultra eXtended Graphics Array (WUXGA) with a resolution of up to 1920×1200 pixels, Widescreen Quad eXtended Graphics Array (WQXGA) with a resolution of up to 2560×1600 pixels, Quad Super eXtended Graphics Array (QSXGA) with a resolution of up to 2560×2048 pixels, another display format, or a combination thereof. Graphics adapter 116 can further provide the video input signal by a high speed serial interface such as a DisplayPort (DP) interface. Further, graphics adapter 136 can be a lower performance graphics adapter providing a video input signal in accordance with a variety of display formats such as Widescreen eXtended Graphics Array (WXGA) with a resolution of up to 1280×768 pixels, or another display format. Graphics adapter 136 can further provide the video input signal by an analog interface such as an RGB interface.

Local display device 180 and secondary display device 185 each receive video output signals from MIGS manager 142. In a particular embodiment, local display device 180 operates using a different video output signal format than secondary display device 185. For example, local display device 180 can be a liquid crystal display (LCD) device with a resolution of 1440×900 pixels, and be connected to a high speed serial interface such as an embedded DisplayPort (eDP) interface. Further, secondary display device 185 can be a high resolution display device such as a QSXGA monitor with a multi-sync capability and an analog interface or a DP interface. In a particular non-limiting example, information handling system 100 may be a notebook computer or mobile computing device with an LCD display and one or more video connector capable of providing video output signals to an external monitor.

In operation, MIGS manager 142 receives video input signals from graphics adapters 116 and 136, and, under the control of resource allocation module 120, sends video output signals to local display device 180 and secondary display device 185. MIGS manager 142 provides video output signals to local display device 180, to secondary display device 185, or to both. For example, MIGS manager 142 can receive a video input signal from graphics adapter 116, and can send a video output signal with that includes substantially the same information to one or the other of local display device 180 and secondary display device 185, to both of local display device 180 and secondary display device 185, or can send a video output signal that includes a portion of the information to local display device 180 and another video output signal that includes a remainder of the information to secondary display device 185. Similarly, MIGS manager 142 can send a video input signal from graphics adapter 136 to one, the other, or both of local display device 180 and secondary display device 185. Further, MIGS manager 142 can send a video input signal from graphics adapter 116 to one of local display device 180 or secondary display device 185, and send a video input signal from graphics adapter 136 to the other of local secondary display device 185 or display device 180.

As noted above, the video input signal provided by graphics adapter 116 can be in a different format than the video input signal provided by graphics adapter 136, and local display device 180 can operate using a different video output signal format than secondary display device 185. MIGS manager 142 operates to match the unlike source video input signal formats from graphics adapters 116 and 136 to common video output signal formats for local display device 180 and secondary display device 185, based upon the type of local display device 180 and secondary display device 185.

The video input signal formats provided by graphics adapters 116 and 136 to MIGS manager 142, and the video output signal formats provided by MIGS manager 142 to local display device 180 and secondary display device 185 can be defined by their resolution and their frame rate. In general, the resolution of a video output signal of MIGS manager 142 can be greater than, less than, or equal to the resolution of a corresponding video input signal of MIGS manager 142. In a particular embodiment, when the resolution of a video output signal is greater than the resolution of a video input signal, MIGS manager 142 centers the information contained in the video input signal in the field of the video output signal. For example, if the video input signal format has a resolution of 1280×768 pixels, and the video output signal format has a resolution of 1440×900 pixels, MIGS manager 120 can place the information from the video input signal in the middle of the video output signal, leaving blank an 80 pixel gap on the left and right sides of the information, and a 66 pixel gap on the top and bottom of the information. In another embodiment, when the resolution of a video output signal is greater than the resolution of a video input signal, MIGS manager 142 scales the information contained in the video input signal to fit the resolution of the video output signal. For example, if the video input signal format has a resolution of 1280×768 pixels, and the video output signal format has a resolution of 2560×1600 pixels, MIGS manager 120 can scale the video input signal by a factor to two to obtain a video input signal of 2560×1536 pixels, and leave blank a 32 pixel gap on the top and bottom of the information. Similarly, when the resolution of a video output signal is less than the resolution of a video input signal, MIGS manager 142 scales the information contained in the video input signal to fit in the field of the video output signal. When the frame rate of the video output signal differs from the frame rate of the video input signal, MIGS manger 142 converts the frame rate of the video input signal to match the frame rate of the video output signal format. In a particular embodiment, MIGS manager 140 determines the type of local display device 180 and of secondary display device 185, and determines whether to center the information contained in the video input signal or to scale the information contained in the video input signal and by how much, and whether to convert the frame rate, based upon the type of local display device 180 and secondary display device 185.

In a particular embodiment, the information displayed by information handling system 100 does not change. For example, when displaying e-mail, an information handling system typically changes the image on an LCD display when a new e-mail is being opened, or an e-mail is being scrolled up or down. Thus, in terms of processing and power, there are periods of time when graphics adapters 116 and 136 are not required to create a new frame. Thus, information handling system 100 includes mid-stream frame buffer 170 that is coupled to shared resources 140 to hold the display information so that graphics adapters 116 and 136 can be placed into a low power mode. In a particular embodiment, MIGS manager 142 receives the video input signals and places the information into mid-stream frame buffer 170. Then MIGS manager 142 converts the information from the frame buffer into the video output signals and sends the video output signals to local display device 180 and secondary display device 185. Resource allocation module 120 then places graphics adapters 116 and 136 into a low power mode. When the frame information needs to be changed, resource allocation module 120 places the appropriate graphics adapter 116 or 136 into a higher power mode to update information in mid-stream frame buffer 170. In another embodiment, MIGS manager 142 receives the video input signals, converts the information into the video output signals, places the video output signals into mid-stream frame buffer 170, and sends the video output signals to local display device 180 and secondary display device 185. By including mid-stream frame buffer 170 mid-stream between graphics adapters 116 and 137 on the processing side, and local display device 180 and secondary display device 185 on the output side, and placing graphics adapters 116 and 136 into a low power mode, information handling system 100 achieves reduced power consumption, and, where information handling system 100 is a battery operated device, greater battery life.

Figure 2:
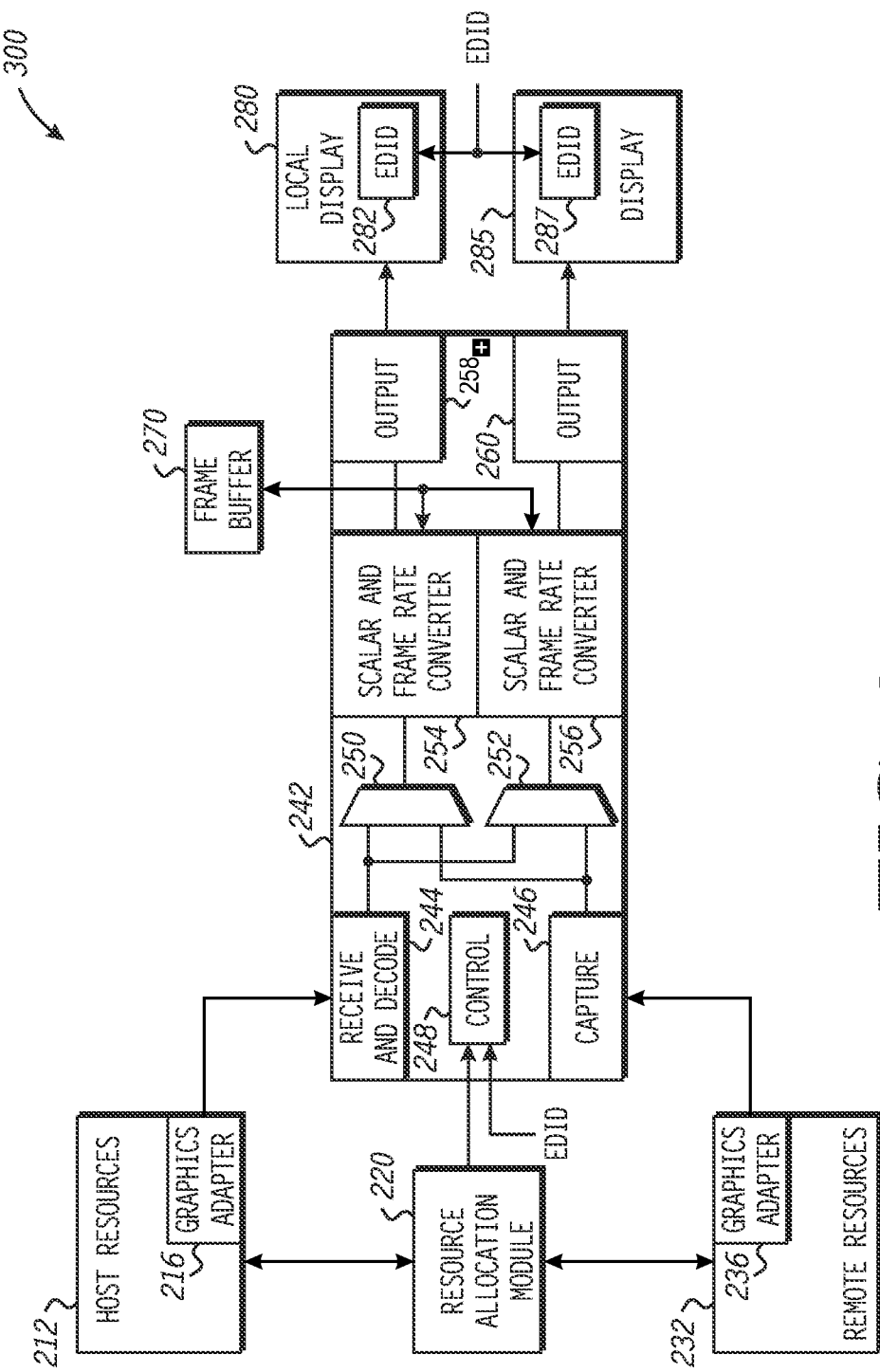
FIG. 2 is a functional block diagram illustrating a video subsystem in an information handling system similar to the information handling system of FIG. 1.

FIG. 2 illustrates an embodiment of a video subsystem 200 in an information handling system that is similar to information handling system 100 of FIG. 1. Video subsystem 200 includes host resources 212 that, are similar to dedicated resources 112, a resource allocation module 220 that is similar to resource allocation module 120, remote resources 232 that are similar to dedicated resources 132, a MIGS manager 242 that is similar to MIGS manager 142, one or more mid-stream frame buffers 270 that are similar to mid-stream frame buffer 170, and local display device 280 and one or more secondary display devices 285 that are similar to local display device 180 and secondary display device 185. Local display device 280 and secondary display device 285 can each include a display device frame buffer (not illustrated). Host resources 212 is associated with a host processing system (not illustrated), and remote resources 232 is associated with a remote processing system (not illustrated). As such, host resources 212 and remote resources 232 are each connected to resource allocation module 220, and resource allocation module 220 is connected to MIGS manager 242.

Host resources 212 includes a graphics adapter 216 similar to graphics adapter 116, and remote resources 232 includes a graphics adapter 236 similar to graphics adapter 136. Graphics adapters 216 and 236 each provide video input signals to MIGS manager 242 and can each include a graphics adapter frame buffer (not illustrated). In the illustrated embodiment, graphics adapter 216 provides the video input signal to MIGS manager 242 via a DP interface, and graphics adapter 236 provides the video input signal to MIGS manager 242 via an RGB interface. In another embodiment (not illustrated), graphics adapter 216 provides more than one video input signal to MIGS manager 242. In another embodiment (not illustrated), graphics adapter 236 provides more than one video input signal to MIGS manager 242. In yet another embodiment (not illustrated), video subsystem 200 does not include remote resources 232 or graphics adapter 236.

MIGS manager 242 includes a receive/decode module 244, a capture module 246, a control module 248, multiplexers 250 and 252, scalar and frame rate converters 254 and 256, and output modules 258 and 260. Receive/decode module 244 includes an input that is connected to receive the DP video input signal from graphics adapter 216, and an output. In a particular embodiment (not illustrated), receive/decode module 244 includes an input buffer that is capable of storing a frame of the video input signal from graphics adapter 216, or a portion of a frame of the video input signal. Capture module 246 includes an input that is connected to receive the RGB video input signal from graphics adapter 236, and an output. In a particular embodiment (not illustrated), capture module 246 includes an input buffer that is capable of storing a frame of the video input signal from graphics adapter 236, or a portion of a frame of the video input signal. Control module 248 includes an interface that is connected to resource allocation module 220, an extended display identification data interface, labeled "EDID," and connections (not illustrated) to the other elements of MIGS manager 242 to control the operation of MIGS manager 242. Multiplexer 250 includes an input that is connected to the output of receive/decode module 244, an input that is connected to the output of capture module 246, and an output. Multiplexer 252 includes an input that is connected to the output of receive/decode module 244, an input that is connected to the output of capture module 246, and an output. Scalar and frame rate converter 254 includes an input that is connected to the output of multiplexer 250, a memory interface that is connected to mid-stream frame buffer 270, and an output. Scalar and frame rate converter 256 includes an input that is connected to the output of multiplexer 252, a memory interface that is connected to mid-stream frame buffer 270, and an output. Output module 258 includes an input that is connected to the output of scalar and frame rate converter 254, and an output. Output module 260 includes an input that is connected to the output of scalar and frame rate converter 256, and an output.

Local display device 280 is connected to the output of output module 258. Local display device 280 includes an EDID register 282 that is connected to control module 248. Secondary display device 285 is connected to the output of output module 260. Secondary display device 285 includes an EDID register 287 that is connected to control module 248.

In operation, receive/decode module 244 determines the resolution and frame rate of the video signal received from graphics adapter 216, decodes the video signal, and outputs the decoded signal to multiplexers 250 and 252. Capture module 246 captures the video signal from graphics adapter 236, determines the resolution and frame rate of the video signal, regenerates the analog signal to create a digital depiction of the information contained in the video signal, and outputs the decoded signal to multiplexers 250 and 252. Control module 248 controls the switching function of multiplexers 250 and 252 to select which of the outputs of receive/decode module 244 or capture module 246 to connect to scalar and frame rate converters 254 and 256. For example, the output from receive/decode module 244 can be excluded from communication to scalar and frame rate converters 254 and 256, or can be sent to one, the other, or both of scalar and frame rate converters 254 and 256. Similarly, the output from capture module 246 can be excluded from communication to scalar and frame rate converters 254 and 256, or can be sent to one, the other, or both of scalar and frame rate converters 254 and 256. In yet another embodiment, graphics adapter 216 can be an only graphics source for video subsystem 200, such that remote resources 232 and graphics adapter 236 may not be present or active in video subsystem 200.

Control module 248 reads the EDID information from EDID registers 282 and 287 to determine the resolution and frame rate associated with local display device 280 and secondary display device 285, respectively. Based upon the resolution and frame rate of local display device 280 and secondary display device 285, control module 248 controls scalar and frame rate converters 254 and 256 to select the appropriate scalar factor and frame rate conversion factor to apply to the signals received from multiplexers 250 and 252, respectively, to match the output expected by local display device 280 and secondary display device 285. Scalar and frame rate converters 254 and 256 apply the selected scalar factor and frame rate conversion factors to the respective signals and send the converted signals to output modules 258 and 260, respectively. In a particular embodiment, one, the other, or both of scalar and frame rate converters 254 and 256 can apply a unity scalar factor, such that output signal has the same resolution as the received signal. In another embodiment, one, the other, or both of scalar and frame rate converters 254 and 256 can apply a unity frame rate conversion factor, such that output signal has the same frame rate as the received signal. Output module 258 provides the converted signal from scalar and frame rate converter 254 to local display device 280. In a particular embodiment, local display device 280 is an eDP type LCD panel, and output module 258 provides a DP output. In another embodiment, local display device 280 is an LCD panel adapted to receive a low voltage differential signaling (LVDS) type signal, and output module 258 provides an LVDS signal. Output module 260 provides the converted signal from scalar and frame rate converter 256 to secondary display device 285. In a particular embodiment, secondary display device 285 is a DP type monitor, and output module 258 provides a DP output. In another embodiment, secondary display device 285 is a monitor adapted to receive a low voltage differential signaling (LVDS) type signal, and output module 260 provides an LVDS signal. In yet another embodiment, secondary display device 285 is, a monitor adapted to receive an RGB type signal, and output module 260 provides an RGB signal.

In a particular embodiment, scalar and frame rate converters 254 and 256 receive the video input signals and place the information into mid-stream frame buffer 270. In another embodiment, scalar and frame rate converters 254 and 256 receive the video input signals, convert the information into the video output signals, and then place the video output signals into mid-stream frame buffer 270. In a particular embodiment (not illustrated), MIGS manager 242 includes one or more additional input modules similar to receive/decode module 244 or capture module 246. In yet another embodiment (not illustrated), MIGS manager 242 includes one or more additional output modules similar to output modules 258 or 260.

Figure 3:
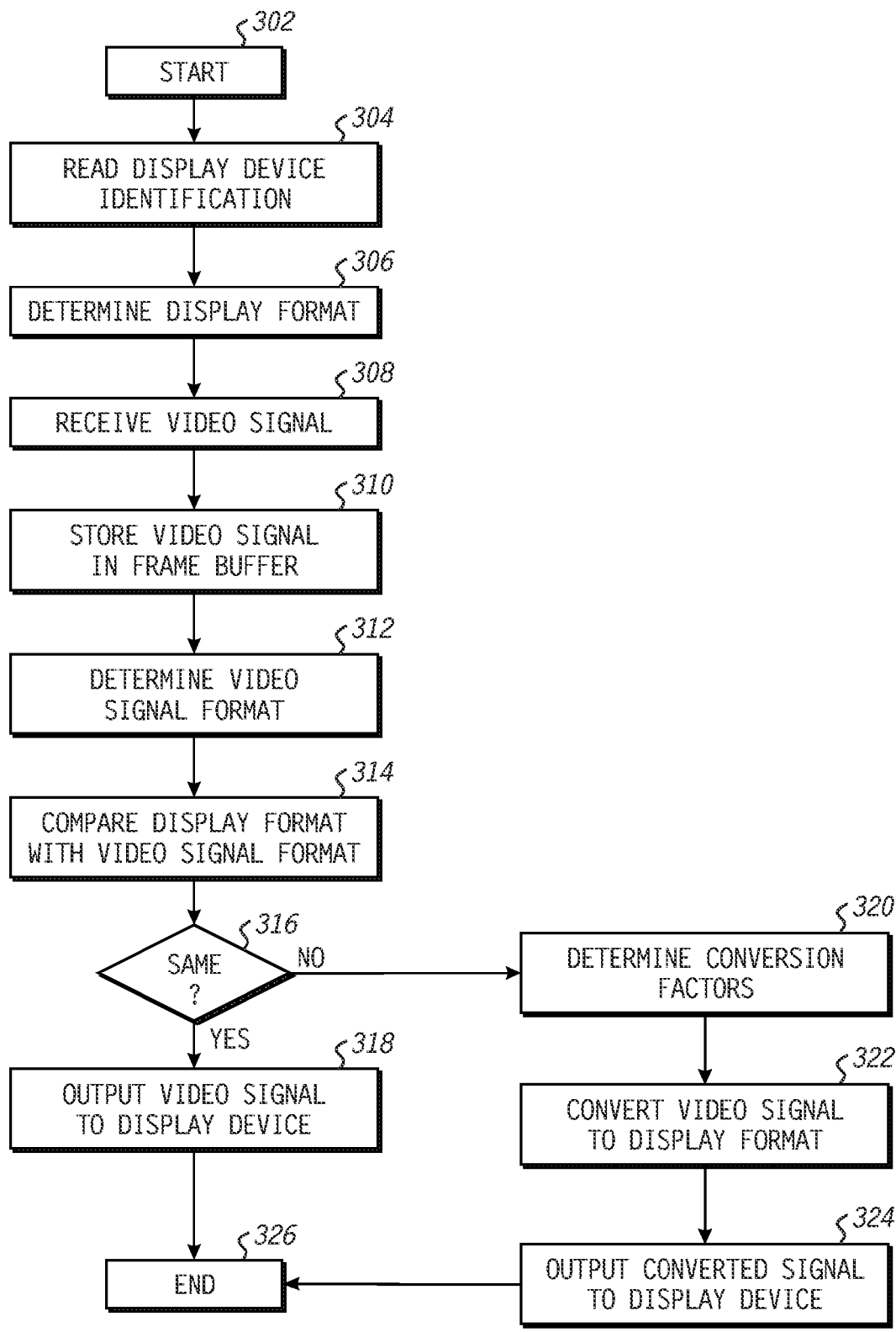
FIG. 3 is a flow chart illustrating a method of managing multiple independent graphics sources in accordance with an embodiment of the present disclosure.

FIG. 3 illustrates a method for managing multiple independent graphics sources in an information handling system in a flowchart form, in accordance with an embodiment of the present disclosure. The method starts at block 302. The identification of a display device is read in block 304. For example, control module 248 can read EDID register 282 local display device 280. The display format of the display device is determined from the identification of the display device in block 306. Thus control module 248 can determine the display format of local display device 280 from the information in EDID register 282. A video signal is received in block 308. As such, capture module 246 can receive the video output signal from graphics adapter 236. In the illustrated embodiment, the video signal is stored in a frame buffer in block 310. Thus control module 248 can direct the video output signal from graphics adapter 236 through multiplexer 250 to scalar and frame rate converter 254 to be stored in mid-stream frame buffer 270.

The format of the video signal is determined in block 312. For example, capture module 246 can include an input buffer, and the format of the video output signal can be determined by control module 248 based upon the contents of the input buffer. The display format of the display device is compared with the format of the video signal in block 314. Thus, the display format of local display device 280 can be compared with the format of the video output signal from graphics adapter 236 by control module 248. A decision is made as to whether or not the display format of the display device is the same as the format of the video signal in decision block 316. If so, the "YES" branch of decision block 316 is taken, and the video signal is outputted to the display device in block 318, and processing ends in block 326. As such, the format of the video output signal from graphics adapter 236 can be the same as the display format of local display device 280, and so scalar and frame rate converter 254 can be set with a unity scalar factor and a unity frame rate conversion factor so that the video output signal from graphics adapter 236 is passed through to local display device 280 without being converted to a different format.

If the display format of the display device is not the same as the format of the video signal, the "NO" branch of decision block 316 is taken and the conversion factors to convert the video format of the video signal into the video format of the display device are determined in block 320. For example, the format of the video output signal from graphics adapter 236 can be different than the display format of local display device 280, and so control module 248 can determine a scalar factor and a frame rate conversion factor to apply to the video output signal to match the display format of local display device 280. The video signal is converted into the display format in block 322. As such, control module 248 can provide the scalar factor and a frame rate conversion factor to scalar and frame rate converter 254 to convert the video output signal from graphics adapter 236 into the display format of local display device 280. The converted signal is outputted to the display device in block 324, and processing ends in block 326. As such, the converted video signal can be sent from scalar and frame rate converter 254 to output module 258 and to local display device 280 in the proper format.

Figure 4:
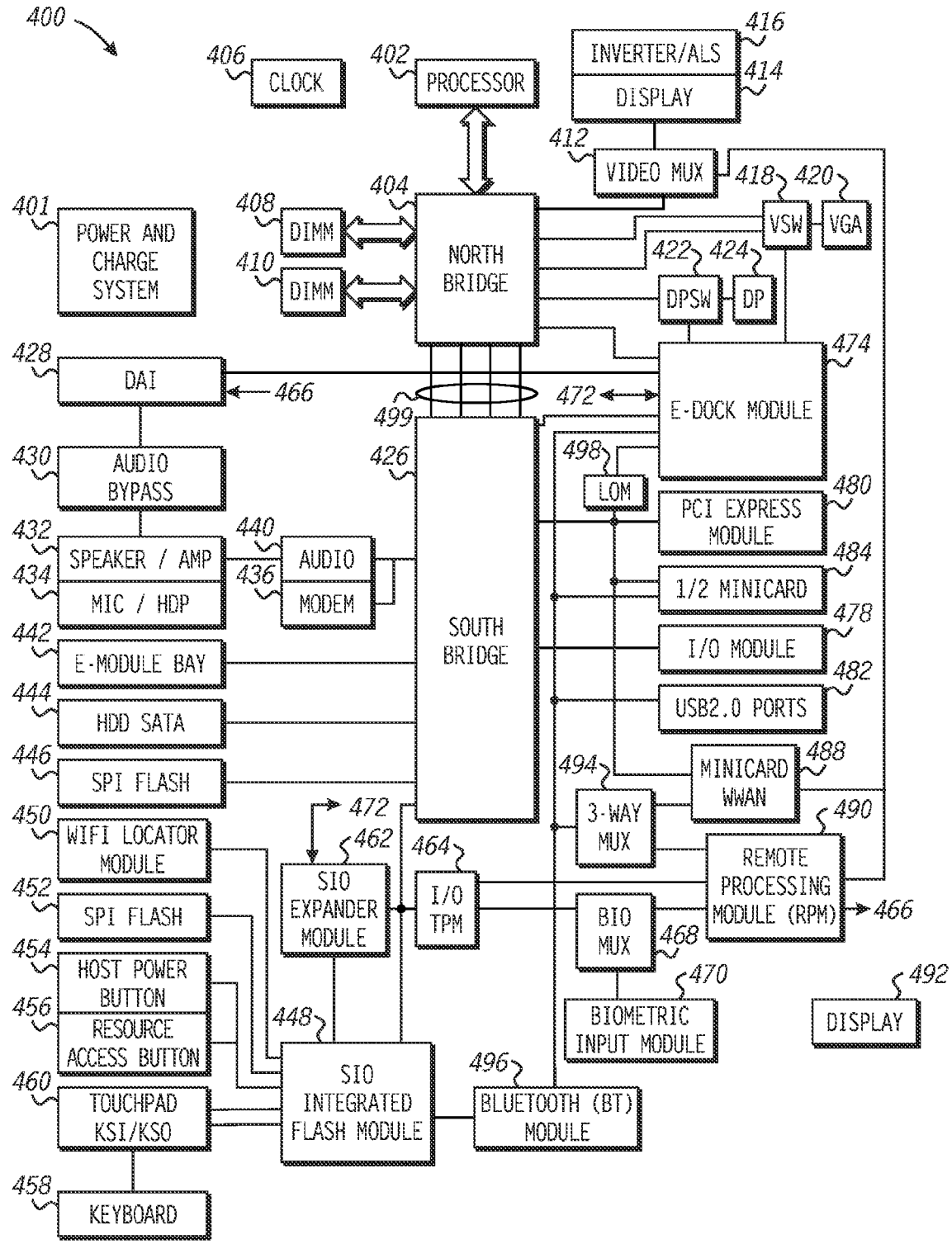
FIG. 4 is a functional block diagram of an information handling system similar to the information handling system of FIG. 1.

FIG. 4 illustrates a functional block diagram of an information handling system 400 similar to information handling system 100 and that includes a processor 402 coupled to a north bridge 404. Processor 402 can be realized as host processing system 110 as described in FIG. 1, or any other module operable as needed or desired. A clock 406 outputs a timing signal to processor 402 and other components or resources of information handling system 400 as needed or required. North bridge 404 is further coupled to a dual in-line memory module (DIMM) 408 and a DIMM 410. North bridge 404 is also coupled to a video multiplexer (Video MUX) 412 operable to multiplex and output video signals to be displayed using a display 414. Display 414 includes an inverter and automatic light sensor (ALS) module 416. North bridge 404 is further coupled to a video switch (VSW) module 418 and a video graphics array (VGA) port 420. A display port (DP) 424 is coupled to a display port switch (DPSW) 422 operable to be coupled to north bridge 404, and an E-Dock module 474. E-Dock module 474 is used to expand resources of information handling system 400, and in various forms, to enable access to a battery or charge source, a media slice, an I/O box, a printer interface, or various other resources that can be accessed when docking information handling system 400 to a docking module.

Information handling system 400 also includes a south bridge 426 coupled to north bridge 404 using a data bus 499. A digital audio interface (DAI) module 428 receives a digital audio signal from an input source 466. A remote processing module (RPM) 490 or other modules are coupled to DAI 428 to input a digital audio signal as input source 466. For example, DAI module 428 can also be coupled to E-Dock module 474. An audio bypass 430 is further coupled to a speaker and amplifier 432, and a microphone and headphone (MIC/HDP) 434. South bridge 426 is also coupled to a modem 436 such as an RJ-11 or plain old telephone system (POTS) enabled modem, and an audio output module 440 operable to couple audio output signals using south bridge 426.

South bridge 426 is coupled to an E-Module bay 442 which can include a bay or cavity that is used to couple and decouple resources that access an internal bus of information handling system 400. For example, E-Module bay 442 can be coupled to south bridge 426 using a multiplexer such as 3-way Mux 494 operable to couple a resource coupled to E-Module bay 442. Examples of resources include disk drives, optical drives, batteries, I/O expander modules, smart card readers, and various combinations thereof. Information handling system 400 further includes a serial advanced technology attachment hard disk drive (SATA HDD) 444, and a serial peripheral interface (SPI) flash memory 446. South bridge 426 is also coupled to a serial I/O (SIO) integrated flash module 448. SIO integrated flash module 448 is coupled to a wireless fidelity (WIFI) locator module 450 which can refer to any type of 802.11x or any other short-range wireless communication. SIO integrated flash module 448 is also coupled to an SPI flash module 452, a host power button 454, and a resource access button interface 456 that can include one or more resource access buttons. SIO integrated flash module 448 is also coupled to a keyboard 458 and touchpad and KSI/KSO module 460. An SIO expander module 462 is also coupled to SIO integrated flash module 448 and is further coupled to an I/O trusted platform module (TPM) 464. I/O TPM 464 is further coupled to a biometric multiplexer (BIO MUX) 468, and a biometric input 470 operable to detect user biometrics (e.g. fingerprints, face recognition, iris detection, EKG/heart monitor, etc.). In other forms, information handling system 400 can also include a security engine (not illustrated) that is coupled to biometric input 470 using RPM 490 to enable and disable access to portions or all of information handling system 400.

E-Dock module 474 is also coupled to SIO integrated flash module 448 and SIO expander module 462 via interface 472. South bridge 426 is further coupled to an I/O module 478, and a peripheral computer interconnect (PCI) express module 480 using a PCI express bus. South bridge 426 is further coupled to a universal serial bus (USB) 3.0 access ports 482 via a host USB bus. A ½ Mini Card module 484 and a Minicard wireless wide area network (WWAN) module 488 are also coupled to south bridge 426 using a PCI express bus.

RPM 490 is coupled to a display 492. RPM 490 can be realized as remote processing system 130 as described in FIG. 1, or any other module operable as needed or desired. RPM 490 can further be configured to output a video signal to the video MUX 412 to output to the display 414. RPM 490 is also coupled to a three (3) way multiplexer 494. 3-way multiplexer 494 multiplexes USB signals from Minicard WWAN 488, RPM 490, and other USB devices (not illustrated) coupled to south bridge 404. South bridge 426 is further coupled to a Bluetooth (BT) module 496 via the USB bus. South bridge 426 is also coupled to a local area network (LAN) on Motherboard (LOM) 498 via a PCI express bus of information handling system 400. LOM 498 is also coupled to PCI express module 480. Information handling system 400 also includes a power and charge system 401 operable to distribute power to the components of information handling system 400, and to charge rechargeable power sources of information handling system 400.

In operation, RPM 490 is configured to detect a user initiated event, a non-user initiated event, network events, clock events, location events, timer events, power events, or any combination thereof. For example, a user initiated event can include a user activating a key, button, or other type of hardware, software, or user selectable interface, or combinations thereof, that can generate a user activated event. Thus, a user can select a button to access a messaging application of information handling system 400. As such, RPM 490 detects a request to access the messaging application and RPM 490 initiates access to resources of information handling system 400 during a reduced operating state of information handling system 400.

RPM 490 also detects non-user initiated events. For example, information handling system 400 can employ Minicard WWAN 488 to receive communication signals via a wireless communication. Minicard WWAN 488 detects the non-user initiated event. For example, a software update can be received and an update can be initiated without user intervention. In another form, an auto-power off feature can be used with a GPS feature of Minicard WWAN 488. Control module 448, RPM 490, or any combination thereof, identifies a resource profile (not illustrated) of the detected event, and initiates activation of resources of information handling system 400 to process the non-user initiated event. According to a further aspect, non-user initiated events, user initiated events, or any combination thereof can be detected. In response to an event, RPM 490, control module 448, or any combination thereof, then initiates placement of resources into designated power modes based on the event. Thus, the power mode for each resource can vary in response to different kind of events. As such, information handling system 400 need not be initialized to process all events, and a limited amount of resources can be activated.

Information handling system 400 further detects non-user initiated events communicated to electronic devices other than information handling system 400 during a reduced operating state of information handling system 400. For example, RPM 490 can be configured to detect a message formatted to be received by a smart phone device, Blackberry device, or any type of electronic device configured to receive messages. Thus, information handling system 400 can employ Minicard WWAN 488 to detect wireless messages communicated via any network operable to communicate messages, such as a wireless messaging network, an SMS network, Blackberry enabled network, or any other type of messaging enabled wireless or wireline network. In another form, the RPM 490 can be wirelessly enabled to receive and transmit wireless communication signals. As such, Minicard WWAN 488 may not be enabled to receive wireless communications.

Information handling system 400 also operates in a low-power mode that includes sufficient resources to detect a wireless signal. As such, RPM 490 can determine a current operating state of information handling system 400, and initiate placing resources in an appropriate power mode to process and output a response to the received wireless signal. As such, an operating environment to output a response to a message, such as a Blackberry message, can be enabled using a limited amount of resources without having to initialize additional resources of information handling system 400. For example, RPM 490 in combination with control 448 can be used to place display 414 in an appropriate power mode to output a received message. Additionally, keyboard 458 or other input devices of information handling system 400 can be placed in an active mode to enable a user to view and respond to a message. As such, a limited resource operating environment can be generated to enable receipt and response to messages without having to initialize information handling system 400. In this manner, information handling system 400 can be realized as a laptop or notebook system that is used to receive messages intended for a Blackberry or other type of messaging device as desired.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a first video processor including a first video output operable to provide a first video signal in accordance with a first video format;
   a first display including a first video input operable to receive a second video signal in accordance with a second video format, wherein the second video format is different from the first video format;
   a second display including a second video input operable to receive a third video signal in accordance with a third video format, wherein the third video format is different from the first and second video formats; and
   a video selector coupled to:
      the first video output;
      the first video input; and
      the second video input;
   wherein the video selector is operable to:
      convert the first video signal into the second video signal;
      convert the first video signal into the third video signal; and
      couple the first video output to a selected one of the first video input or the second video input.

2. The information handling system of claim 1 wherein further:
   the first video processor includes a second video output operable to provide a fourth video signal in accordance with a fourth video format, wherein the fourth video format is different from the first, second, and third video formats; and
   the video selector is coupled to the second video output, and is operable to:
      convert the fourth video signal into the second video signal;
      convert the fourth video signal into the third video signal; and
      couple the fourth video output to a selected one of the first video input or the second video input.

3. The information handling system of claim 2 further comprising:
   a second video processor including a third video output operable to provide a fifth video signal in accordance with a fifth video format, wherein the fifth video format is different from the first, second, third, and fourth video formats; and
   wherein the video selector is coupled to the second video processor, and is operable to:
      convert the fifth video signal into the second video signal;
      convert the fifth video signal into the third video signal; and
      couple the third video output to a selected one of the first video input or the second video input.

4. The information handling system of claim 3 wherein the video selector is further operable to send the video information from the first, second, or third video output to a mid-stream frame buffer.

5. The information handling system of claim 4 in response to sending the video information to the frame buffer, the information handling system is operable to operate the video processor associated with the selected video output in a low power mode.

6. The information handling system of claim 3 wherein the video selector is further operable to send the video information from the first or second video input to a mid-stream frame buffer.

7. The information handling system of claim 6 in response to sending the video information, the information handling system is operable to operate the video processor associated with the selected video output in a low power mode.

8. The information handling system of claim 1 further comprising an allocator operatively coupled to the first video processor, the second video processor, and the video selector, wherein the allocator is operable to control the selector to couple the first video output to the selected one of the first or the second video inputs.

9. The information handling system of claim 8 wherein the allocator operates to control the video selector in response to an event at the information handling system.

10. The information handling system of claim 1 wherein, in converting the first video signal into the second video signal, the video selector is further operable to convert a first frame rate associated with the first video signal into a second frame rate associated with the second video signal.

11. The information handling system of claim 10 wherein, in converting the first video signal into the second video signal, the video selector is further operable to apply a scalar factor to the first video signal to convert a first resolution of the first video signal into a second resolution of the second video signal.

12. The information handling system of claim 11 wherein the video selector is further operable to determine the second frame rate and the scalar factor in response to determining a device identifier associated with the first display.

13. A method comprising:
receiving a first video signal from a first video processor associated with a first processing system, wherein the first video processor is operable to provide the first video signal in accordance with a first video format;
in response to receiving the first video signal, storing first video information based on the first video signal in a mid-stream frame buffer;
sending a second video signal to a first display, wherein the first display is operable to receive the second video signal in accordance with a second video format, and wherein the second video format is different from the first video format;
sending a third video signal to a second display, wherein the second display is operable to receive the third video signal in accordance with a third video format, and wherein the third video format is different from the first and second video formats;
in response to a first event, converting the first video signal into the second video signal; and
in response to a second event, converting the first video signal into the third video signal.

14. The method of claim 13 further comprising:
receiving a fourth video signal from a second video processor associated with a second processing system, wherein the second video processor is operable to provide the fourth video signal in accordance with a fourth video format that is different from the first, second, and third video formats;
in response to receiving the fourth video signal, storing fourth video information based on the fourth video signal in the mid-stream frame buffer;
in response to a third event, converting the fourth video signal into the second video signal; and
in response to a fourth event, converting the fourth video signal into the third video signal.

15. The method of claim 14 further comprising:
prior to converting the first video signal into the second or third video signals, receiving the first video signal from the mid-stream frame buffer; and
prior to converting the fourth video signal into the second or third video signals, receiving the fourth video signal from the mid-stream frame buffer.

16. The method of claim 14 further comprising storing the second or third video signals in the mid-stream frame buffer.

17. A device comprising:
a memory; and
a processor operable to execute code to:
receive a first video signal from a first video processor associated with a first processing system, wherein the first video processor is operable to provide the first video signal in accordance with a first video format;
in response to receiving the first video signal, store first video information based on the first video signal in a mid-stream frame buffer;
send a second video signal to a first display, wherein the first display is operable to receive the second video signal in accordance with a second video format, and wherein the second video format is different from the first video format;
send a third video signal to a second display, wherein the second display is operable to receive the third video signal in accordance with a third video format, and wherein the third video format is different from the first and second video formats;
in response to a first event, convert the first video signal into the second video signal; and
in response to a second event, convert the first video signal into the third video signal.

18. The device of claim 17, the processor further operable to execute code to:
receive a fourth video signal from a second video processor associated with a second processing system, wherein the second video processor is operable to provide the fourth video signal in accordance with a fourth video format that is different from the first, second, and third video formats;
in response to receiving the fourth video signal, store fourth video information based on the fourth video signal in the mid-stream frame buffer;
in response to a third event, convert the fourth video signal into the second video signal; and
in response to a fourth event, convert the fourth video signal into the third video signal.

19. The device of claim 18, the processor further operable to execute code to:
prior to converting the first video signal into the second or third video signals, receive the first video signal from the mid-stream frame buffer; and
prior to converting the fourth video signal into the second or third video signals, receive the fourth video signal from the mid-stream frame buffer.

20. The device of claim 18, the processor further operable to execute code to store the second or third video signals in the mid-stream frame buffer.

* * * * *